Jan. 5, 1954
R. K. SUPER
2,664,972
BRAKE MECHANISM
Filed June 4, 1948
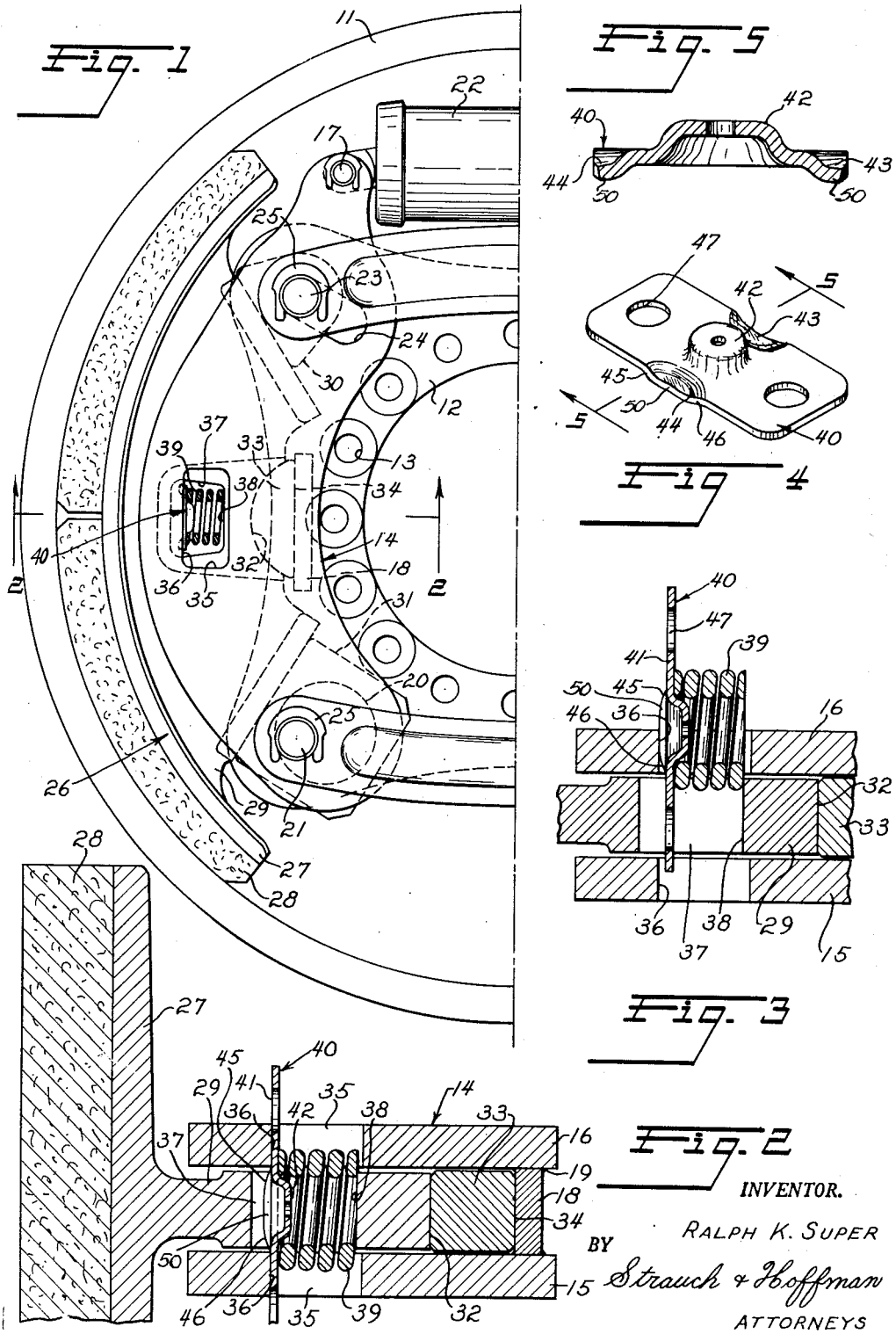
INVENTOR.
RALPH K. SUPER
BY
Strauch & Hoffman
ATTORNEYS Patented Jan. 5, 1954

2,664,972

UNITED STATES PATENT OFFICE 2,664,972

BRAKE MECHANISM

Ralph K. Super, Detroit, Mich., assignor, by mesne assignments, to Rockwell Spring and Axle Company, Coraopolis, Pa., a corporation of Pennsylvania Application June 4, 1948, Serial No. 31,102

3 Claims. (Cl. 188—78)

This invention relates generally to friction brake mechanisms and more specifically to the type of friction brake mechanisms wherein a brake shoe is mounted for sliding and rocking movement upon a pivoted actuating lever assembly. The invention is an improvement over that disclosed and claimed in United States Letters Patent No. 2,399,654, issued to H. W. Alden et al. on May 7, 1946.

It is the major object of this invention to provide a brake assembly wherein a brake actuating lever has a brake shoe rockably mounted thereon and a novel spring retainer is interposed therebetween.

A still further object of this invention is to provide a novel retainer for a spring or other resilient means adapted to hold a brake shoe in rockable assembly with a brake actuating lever, the retainer being of such construction as to facilitate assembly or disassembly of the brake shoe, the actuating lever and the resilient means.

These and other objects of the invention will become apparent as the specification continues with reference to the appended claims and the annexed drawings wherein:

Figure 1 is a side elevation, partly in section, illustrating one-half, on one side of a center line, of a symmetrical friction brake mechanism having a brake shoe resiliently mounted for rocking and sliding movement upon a brake actuating lever and incorporating a spring retainer according to a preferred embodiment of this invention;

Figure 2 is a sectional view taken substantially along line 2—2 of Figure 1 illustrating the manner in which the retainer maintains the assembled relationship of the brake shoe, the actuating lever and the spring;

Figure 3 is a fragmentary sectional view illustrating the manner of assembly or disassembly of the spring and retainer with the brake shoe and lever;

Figure 4 is a pictorial view of the spring retainer of Figures 1–3; and

Figure 5 is a section through the short dimension of the spring retainer of Figure 4 illustrating the side depressions.

The specification now proceeds with continued reference to the drawings wherein like numerals designate like parts throughout the several figures.

A rotatable brake drum 11 surrounds a brake spider 12 which is non-rotatably secured in any conventional manner, as by rivets passing through a row of rivet holes 13, to an axle housing (not shown). A brake shoe actuating lever assembly 14 comprises a pair of similar plates 15 and 16 which are secured together in laterally spaced relation by a shouldered stud 17 and a saddle bar 18 that is butt welded between the plates as illustrated at 19 in Figure 2. The lever assembly 14 is pivotally mounted at its lower end upon spaced concentric portions of a rotatably adjustable anchor pin 21 mounted in a leg of the brake spider. Anchor pin 21 is formed with an eccentric cylindrical portion 20 between plates 15 and 16 as illustrated in Figure 1. At the upper end of the lever assembly, stud 17 is operably pivotally connected to any conventional actuating means such as a hydraulic cylinder 22.

An upper anchor pin 23 is rigidly mounted on spider 12 in vertical alignment with lower anchor pin 21 and passes through an elongated opening 24 in lever assembly 14 which permits rocking of the lever assembly about lower pin 21. Fastening elements 25 are carried by pins 21 and 23.

A brake shoe 26 comprises an arcuate platform 27 adapted to carry a friction lining 28 secured thereto in a conventional manner. The inner periphery of platform 27 merges into an integral radial web 29 that extends into the space between plates 15 and 16 of the actuating lever assembly. Web 29 is formed with an arcuate surface 32 in bearing contact with a free rocker or fulcrum member 33 that has an opposite flat surface 34 in sliding contact with saddle bar 18. Shoe web 29 is formed at opposite ends with inclined faces in sliding engagement with abutments 30 and 31 freely pivoted on upper anchor pin 23 and eccentric 20, respectively.

Radially outwardly from saddle bar 18, the actuating lever assembly is provided with an opening comprising aligned generally rectangular apertures 35 in plates 15 and 16. Apertures 35 are formed on the outer side nearest platform 27 with laterally aligned parallel faces 36 which lie in a plane parallel to surface 34.

Web 29 of the brake shoe is formed with an aperture 37 located to overlap faces 36 of the lever assembly. The inner edge of brake shoe aperture 37 is a flat face 38 lying in a plane perpendicular to a radius bisecting the arc of surface 32. Normally face 38 is substantially parallel to faces 36.

A short coil spring 39 is compressed and inserted into aperture 37 of the brake shoe. Spring 39 has a diameter larger than the width of web 29 and the wire comprising it is of sufficient size to bridge the spaces between the web and the lever assembly as illustrated in Figure 2. The inner end of spring 39 seats on face 38. The outer end of spring 39 seats on a retainer member 40 that bridges plates 15 and 16, and has a flat bottom surface 41 that rests on faces 36 in the assembly.

In the preferred embodiment of the invention, retainer 40 comprises a relatively rigid stamping of stiff sheet metal formed with a central cupped cylindrical boss or button 42 that extends within coil spring 39. Retainer 40 is formed in lateral alignment with button 42 with side edge depressions 43 and 44. As illustrated in Figures 4 and 5, each of these depressions provides opposed sloping cam faces 45 and 46 joined by an intermediate slide face 50, the functions of which will hereinafter be described. As illustrated in Figure 2, when retainer 40 is mounted and spring 39 held in the assembly, cam faces 45 and 46 lie just inside the adjacent inner sharp corners of faces 36 which thereby oppose relative lateral movement of retainer 40. In addition to opposing displacement of the retainer, cam faces 45 and 46 act to center the retainer in the assembly, and button 42 serves as a pilot and seat for spring 39.

Spring 39 reacts between the lever assembly and the brake shoe to thereby force the brake shoe firmly against rocker member 33 and force the rocker member firmly against saddle bar 18 of the brake lever assembly. Spring 39 is thus the sole means holding the brake shoe and rocker member in assembled relationship with the actuating lever. Neither the retainer member 40 nor spring 39 can be removed from the assembled position either separately or together without further compression of the spring.

In assembling the brake shoe with the actuating lever assembly, brake shoe 26 and rocker member 33 are placed in their correct relative positions with respect to lever assembly 14. Retainer member 40, with spring 39 seated on button 42 and sufficiently axially compressed that its inner end may slide on face 38, is inserted longitudinally through an aperture 35 as is shown in Figure 3. As the spring and retainer assembly move into shoe opening 37, cam faces 46 which are laterally aligned ride up over the edge of adjacent surface 36 further compressing spring 39 until the intermediate slide faces of depressed regions 43 and 44 ride upon and over face 36 and then drop into the centered position of Figure 2 where spring 39 is permitted to expand slightly to center and seat the assembly. Cam faces 45 and 46 now engage the adjacent inner corners of faces 36 to positively centrally locate the retainer and spring, the projecting ends of the retainer forming a bridge between surfaces 36.

In order to separate shoe 26 from the lever, as for relining, the retainer is of such length that its opposite ends project beyond plates 15 and 16 of the lever assembly. Pliers or some similar tool may thus be used to grasp one available end of the retainer and administer a longitudinal pull. This causes the cam face 45 (Figure 3) of the retainer to ride up over the adjacent corner of aperture 35 in the brake lever assembly, thereby compressing spring 39 and permitting the retainer and resilient element to be easily removed together from their assembled position.

The ends of the retainer member may also be provided with apertures 47 whereby a screwdriver, rod or similar tool may be inserted therein and used as a lever to pry the retainer from its assembled position.

A satisfactory retainer member 40 which has proved successful in practice is made of stiff metal of about $\frac{1}{16}$ inch thickness and about 1⅛ inches wide by 2½ inches long. The button 42 is about $\frac{17}{32}$ inches in diameter and projects about ⅛ inch above the surface of the retainer plate. The lower edges of depressions 43 and 44 are about $\frac{1}{16}$ inch below surface 41, this dimension representing the added compression and consequent expansion of spring 39 during assembly. Cam faces 45 and 46 may be arcs of about ½ inch radius, or similarly sloped from surface 41 to the intermediate faces 50 of depressions 43 and 44.

The general operation and other structure of the brake mechanism in which the present invention is embodied is that disclosed in Alden Letters Patent No. 2,399,654, to which reference is made for further detail.

This invention may be embodied in other specific forms without departing from the spirit or essential characteristics thereof. The present embodiments are therefore considered to be in all respects as illustrative and not restrictive, the scope of the invention being indicated by the appended claims rather than by the foregoing description, and all changes which come within the meaning and range of equivalency of the claims are intended therefore to be embraced therein.

What is claimed and desired to be secured by United States Letters Patent is:

1. In a brake assembly, a brake shoe having a web formed with an aperture, a brake shoe actuating lever having spaced side walls between which said web extends and formed with apertures substantially aligned with said web aperture in the assembly, a compression spring having one end engaged with the inner edge of said web aperture, a spring retainer plate extending through said web aperture and bridging said side wall apertures, means seating the other end of said spring on said retainer plate comprising a boss projecting from the adjacent surface of said plate, and laterally aligned cams projecting from the opposite surface of the plate at opposite side edges of the plate and each comprising a pair oppositely sloping cam faces joined by an intermediate slide face, said cam faces serving to center the retainer plate between said side walls and being adapted to engage and ride over the adjacent edge of one of said side wall apertures to compress the spring during insertion and withdrawal of the retainer plate and spring as a unit in the assembly, said plate sliding on said intermediate slide face during said insertion and withdrawal.

2. An integral stamped metal spring retainer element adapted for interposition in a brake shoe and lever assembly comprising a stiff metal plate having a central spring seat boss formed by metal displaced out of the plane of the plate in one direction and having at opposite sides edges of said plate laterally aligned cam projections formed by displacement of metal in the opposite direction out of the plane of the plate, each of said cam projections comprising oppositely sloping cam faces joined by an intermediate slide face.

3. An integral spring retainer element comprising a rigid plate having a central spring seat boss upstanding from the plane of the plate in one direction and having at opposite side edges of said plate laterally aligned cam projections that extend in the other direction from the plane of the plate, each of said cam projections comprising oppositely sloping cam faces joined by an intermediate slide face.

RALPH K. SUPER.

References Cited in the file of this patent

UNITED STATES PATENTS

| Number | Name | Date |
|---|---|---|
| Re. 22,604 | Alden et al. | Feb. 20, 1945 |
| 775,271 | Graham | Nov. 15, 1904 |
| 1,657,934 | Martin | Jan. 31, 1928 |
| 1,897,836 | Bristol | Feb. 14, 1933 |
| 1,989,433 | Symington | Jan. 29, 1935 |
| 2,399,654 | Alden et al. | May 7, 1946 |
| 2,432,983 | Buckendale et al. | Dec. 23, 1947 |